UNITED STATES PATENT OFFICE.

SALOMON ROSE, OF CINCINNATI, OHIO.

IMPROVED COMPOSITION FOR DESTROYING VERMIN.

Specification forming part of Letters Patent No. 42,795, dated May 17, 1864.

*To all whom it may concern:*

Be it known that I, SALOMON ROSE, of Cincinnati, Hamilton county, Ohio, have invented a new and useful Composition for the Destruction of Rats, Mice, and other Vermin; and I do hereby declare the following to be a full, clear, and exact description thereof, and of the mode of compounding the same.

I mix a quarter of an ounce of stick-phosphorus in a table-spoonful of warm water and stir the same into half a pint of cold water. I then take a pound of flour and convert the same into a paste by briskly working it in the above solution; and, lastly, I thoroughly blend with said paste one-sixth of an ounce of oil of rhodium.

I claim as new and of my invention—

The composition for destroying vermin, composed and compounded as herein described.

In testimony of which invention I hereunto set my hand.

SALOMON ROSE.

Witnesses:
GEO. H. KNIGHT,
JAMES H. LAYMAN.